3,386,891
ALKYLATE PURIFICATION BY TEMPERATURE CONTROLLED DISTILLATION
Walter C. Hart, Bartlesville, Okla., assignor to Phillips Petroleum Company, a corporation of Delaware
Filed Dec. 31, 1964, Ser. No. 422,856
9 Claims. (Cl. 203—1)

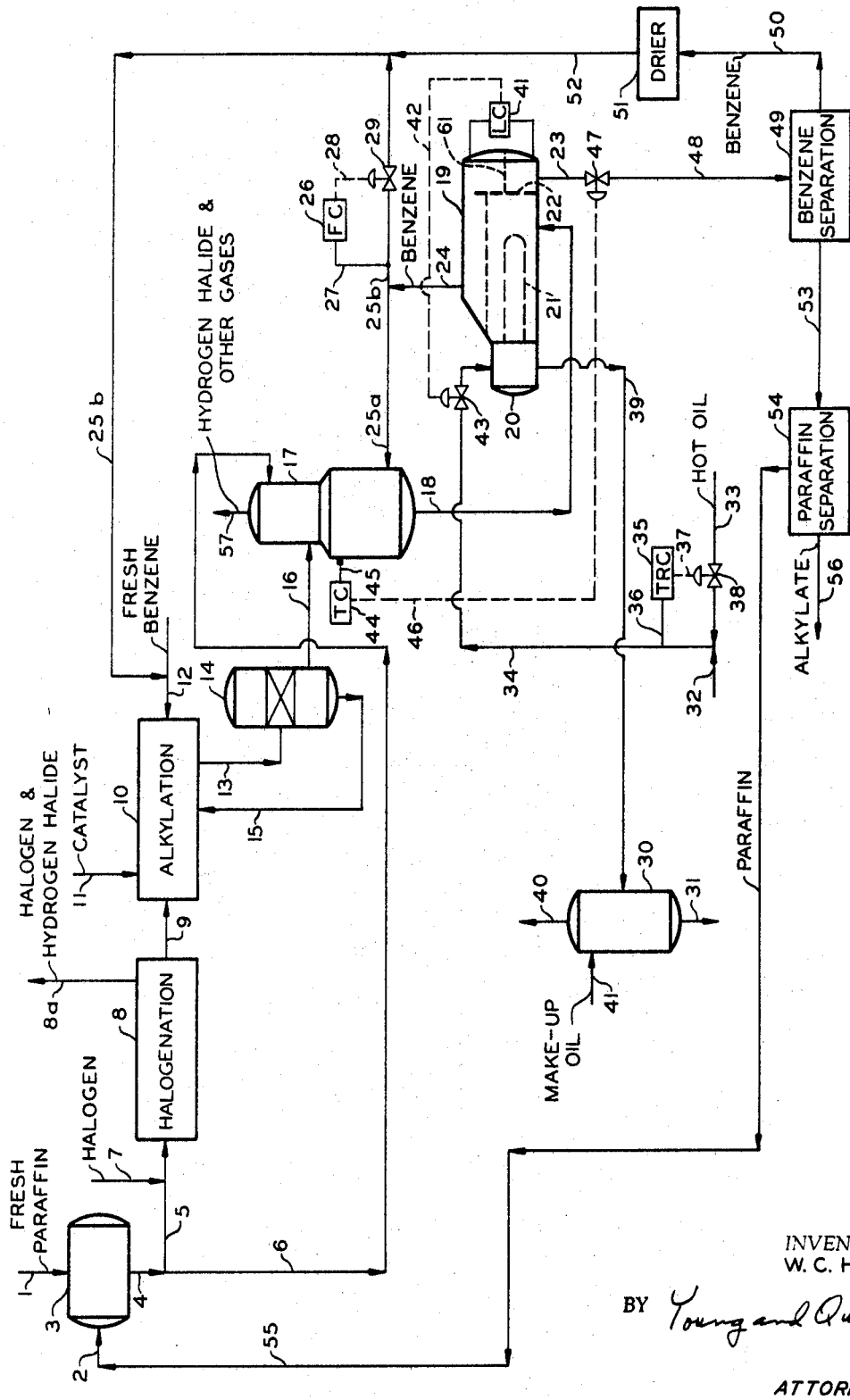

ABSTRACT OF THE DISCLOSURE

An alkylate is stripped of undesired light materials such as hydrogen halide and heated substantially to but not above dealkylation temperature by a combination of heating fluids which are combined in response to the temperature of said combination of heating fluids, and feeding the heating fluids to a heat exchange zone containing alkylate in relation to the amount of alkylate in said heat exchange zone.

---

This invention relates to a method and apparatus for controlling the temperature of a heating zone or device. This invention also relates to a method and apparatus for stripping and reboiling an alkylation reaction mass.

Although for the sake of simplicity this invention will be described in reference to alkylation operations, it is to be understood that this invention is broadly applicable to any situation wherein a heating zone or device is to be operated at a maximum possible temperature without risk of exceeding that maximum temperature even on the surface of the heating element. Thus, this invention applies broadly to precise heat exchange procedure.

Heretofore when a liquid material which was to be heated in a heat exchange zone could not be heated above a maximum temperature due to various contingencies such as thermal decomposition of the material above the maximum temperature, the heating medium passed through the heat exchange zone was carefully adjusted to always be quite substantially below that maximum temperature. For example, significant amounts of alkylate decompose when heated in the presence of a catalyst such as aluminum chloride at temperatures above 275° F. Heretofore in order to insure that no part of the alkylate in a reboiler was heated above 275° F., the heating medium passed through the reboiler was maintained at a temperature of approximately 260° F. so that the surface of the heating device which is in contact with the alkylate in the reboiler would not exceed 275° F. This was done because past experience proved that if it was attempted to heat a supply of heating medium precisely to a predetermined temperature of 280° F. in order to keep the heating surface which contacts the alkylate at or below 275° F., it was inevitable that the heating medium would sometimes be heated to a temperature greater than 280° F. and that when this occurred overheated medium was passed through the reboiler thereby overheating the heating device and causing some dealkylation of the alkylate. This dealkylation was increased if at the time there was also a minimum rate, as compared to other times, of alkylate passing through the reboiler.

Thus, this prior heating operation heats the alkylate at approximately a 15° F. safety factor, i.e., approximately 15° F. below the maximum possible temperature of 275° F., and therefore does not operate under the maximum possible heating conditions as dictated by the 275° F. maximum temperature.

Also heretofore heating of alkylate at a predetermined temperature was effected with steam at a regulated pressure. However, such an operation is undesirable since generally the steam is at a higher pressure than the alkylate and since the reactants and products (alkylate) in such operations must be maintained substantially water-free. Thus, as long as steam is present as a source of heat in this type of operation the possibility of a steam, and therefore water, leak into the reactants and products is an omnipresent problem.

It has now been found that a fluid material can be heated in a heat exchange zone substantially to the maximum temperature allowable, thereby substantially reducing the magnitude of the above prior heating operations safety factor, without risk of exceeding that maximum temperature even though the rate and therefore the amount of fluid material passing through the heat exchange zone continuously varies. Such precise heating is accomplished if a first stream of heating medium at a temperature substantially below the maximum temperature has added thereto a second stream of heating medium at a temperature substantially above the maximum temperature thus forming an initial composite stream, the temperature of this composite stream is sensed and in response thereto the rate of addition of the second stream of heating medium to the first stream of heating medium is adjusted to produce a composite stream of heating medium which follows the initial stream and which can be at a temperature slightly below, substantially equal to or slightly above the maximum temperature.

The composite stream is preferably slightly below the maximum temperature in order to provide a safety factor for any overheating of the heating medium that can occur before the temperature of the composite stream is sensed. This safety factor is by no means of a magnitude of 15° F. but is rather of a magnitude of only a few degrees Fahrenheit at most. Thus, the temperature of the heating medium used in this invention more closely approaches the maximum possible heating conditions as discussed above.

The composite stream is thereafter maintained substantially at the maximum temperature by varying the rate of addition of the second, hotter stream to the first, cooler stream. However, the temperature of the composite stream could be controlled by regulating the rate of addition of the cooler stream to the hotter stream. The composite stream is then passed through the heat exchange zone and the rate of such passing is controlled by sensing the amount of fluid material in the heat exchange zone and varying the rate of flow of the composite stream to the heat exchange zone so that as the amount of the fluid material increases the rate of flow of the composite stream increases and as the amount of the fluid material decreases the rate of flow of the composite stream decreases. This control of the rate of flow of the composite stream to the heat exchange zone contributes to the decreasing of the magnitude of the before mentioned, required, temperature safety factor by lessening the chances for overheating due to there being a small amount of alkylate, catalyst, etc., in the heat exchange zone to be heated.

Thus, it can be seen that this invention provides for maximum variation in the rate of heat transferred into a reboiler with a given size heat exchange surface in the reboiler. This will allow the use of a smaller heat exchange surface in the reboiler for a predetermined rate of heat exchange into the reboiler than that of prior methods described above.

Accordingly, it is an object of this invention to provide an improved method and apparatus whereby a liquid material is heated to the maximum possible temperature without danger of exceeding temperature even though the amount of liquid material to be heated continuously varies during the heating process.

It is another object of this invention to provide an improved method and apparatus whereby alkylate can be heated in the presence of catalyst up to the temperature at which the alkylate decomposes without risk of exceeding the decomposition temperature at times when minimum rates of alkylate are passed to be heated.

It is another object to provide an improved method and apparatus whereby alkylate can be heated in the presence of catalyst up to the temperature at which alkylate decomposes without risk of exceeding the decomposition temperature at times when minimum amounts of alkylate are present to be heated.

It is another object to provide an improved method and apparatus for stripping and reboiling and alkylation reaction mass.

Other aspects, objects and the several advantages of the invention will be apparent to those skilled in the art from the description and the appended claims.

The drawing diagrammatically embodies a system employing this invention.

In the drawing fresh paraffin feed from 1 and recycle paraffin feed from 2 is collected in accumulator 3 and passes by 4 into both 5 and 6. The paraffin feed in 5 is mixed with halogen from 7 and halogenated in 8. Excess halogen and some hydrogen halide is removed from 8 by 8a. The halogenated paraffin passes from 8 by 9 to alkylation zone 10 wherein it is mixed with catalyst from 11 and aromatic from 12. The alkylate reaction mass containing alkylate, halogenated paraffins, aromatic, catalyst and hydrogen halide is removed from 10 by 13 and passed to coalescer 14 in which catalyst sludge is removed and returned by 15 to alkylation zone 10. The alkylate reaction mass is removed from 14 by 16 and passed to stripper 17. Paraffin feed from 6 passes into an upper portion of stripper 17 as reflux.

In stripper 17, which operates at a temperature from 50° F. at the top to 245° F. at the bottom and a pressure from 0 at the top to 5 p.s.i.g. at the bottom, the paraffin feed from 6 is utilized as a medium for removing benzene from hydrogen halide vapors formed from the alkylate reaction mass. The paraffin feed is purified by removal of, when present, at least one of oxygen, hydrogen, carbon monoxide and carbon dioxide. The oxygen, etc., gaseous impurities are stripped from the paraffins by the hydrogen halide vapors and the paraffin feed condenses benzene vapors from the hydrogen halide vapors evolved from the alkylate reaction mass.

Although the compositions of the various streams employed in this invention can vary over a wide range depending upon a large number of factors, representative compositions will be enumerated. The alkylate reaction mass can contain from 5 to 30 weight percent (all percentages hereinafter are by weight unless otherwise stated) of alkylate, from a trace to 40 percent paraffins, from 29 to 70 percent benzene, from 0.5 to 5 percent hydrogen halide and from a trace to 1 percent catalyst. The hydrogen halide vapors after contact with the paraffin feed can contain at least 97 percent hydrogen halide, from a trace to 2 percent paraffins and at least one of from a trace to 450 parts per million (p.p.m.) oxygen, from a trace to 900 p.p.m. nitrogen and from a trace to 150 p.p.m. carbon monoxide and carbon dioxide. The alkylate product after separation of the halide vapors therefrom and with the addition of the paraffin feed can contain from 5 to 30 percent alkylate, from 10 to 45 percent paraffins, from 25 to 65 percent benzene and from a trace to 1 percent catalyst. The paraffin feed before contact with hydrogen halide vapors can contain at least 96 percent paraffins, from a trace to 1 percent hydrogen halide, from a trace to 2 percent halogen, and at least one of from a trace to 4 percent benzene, from a trace to 150 p.p.m. oxygen, from a trace to 500 p.p.m. nitrogen and from a trace to 150 p.p.m. of carbon monoxide and carbon dioxide.

Generally any normal paraffin or mixtures of normal paraffins can be employed in this invention. Two commercially feasible mixtures include:

| | Mixture 1 [1] | Mixture 2 [2] |
|---|---|---|
| Number of Carbon Atoms per Molecule of Normal Paraffins: | | |
| 9 and less | [3] 0.5 | |
| 10 | 3–20 | |
| 11 | 27–47 | [3] 0.5 |
| 12 | 23–42 | 18–38 |
| 13 | 10–30 | 33–53 |
| 14 | [3] 0.5 | 17–37 |
| 15 | [3] 0.5 | 1–10 |
| 16 | [3] 0.5 | [3] 0.5 |
| Average molecular weight | 155–173 | 173–195 |

[1] Light paraffin mixture, amount of each normal paraffin present in weight percent.
[2] Heavy paraffin mixture, amount of each normal paraffin present in weight percent.
[3] Maximum.

Generally, a hydrocarbon feed containing at least 95 percent of normal paraffins having from 10 to 16 carbon atoms per molecule and, when present, at least one of from a trace to 600 p.p.m. oxygen, from a trace to 1200 p.p.m. nitrogen and from a trace to 300 p.p.m. carbon monoxide and carbon dioxide can be utilized in the practice of this invention.

The hydrogen halide and other gases are removed from 17 by 57. The alkylate reaction mass purified of hydrogen halide and other gases is removed from 17 by 18 and passed to reboiler 19 which has thereon manifold 20 for receiving heating medium and passing same through 19 by means of loop 21. Reboiler 19 has therein baffle 22 over which passes heated alkylate reaction mass liquid to be removed from 19 by 23. The alkylate reaction mass is heated in 19 to a temperature which does not exceed the dealkylation temperature, i.e., decomposition of the alkylate due to the temperature and catalyst present, but which removes a large amount of benzene associated with the alkylate reaction mass by vaporizing same and removing the vapors by 24. The vapors are then passed by 25a to 17 for use as a heating medium or by 25b to 12 for reuse in alkylation zone 10 or both. The flow of benzene through 25b is controlled by rate of flow controller 26 which is operatively connected to an upstream portion of 25b by 27 and by 28 to motor valve 29 in a downstream portion of 25b.

Surge tank 30 holds a supply of heating medium such as oil at a temperature substantially below, i.e. from about 0.05 to about 0.95, preferably 0.80 to 0.95, still more preferably 0.91, that of the maximum temperature in degrees Fahrenheit to which the alkylate in heat exchanger 19 can be heated in the presence of the catalyst present in the alkylate reaction mass. Also, this heating medium, when employed at temperatures of less than 1000° F., can vary from about 5 to about 250, preferably from about 10 to about 40° F., below said maximum temperature. For sake of simplicity of description the above mentioned maximum temperature will be taken to be 275° F. and the oil removed from 30 by 31 will be at a temperature of about 250° F.

The 250° F. oil in 31 passes through 32 wherein it is contacted with a heating medium which is substantially the same as that in 32 or which is at least compatible with that in 32 and which is at a temperature substantially higher than the maximum temperature, i.e., from about 1.3 to about 2.7, preferably from about 1.9 to about 2.1, still more preferably about two times the maximum temperature in degrees Fahrenheit. Similarly, when temperatures of less than 1000° F. are employed, this heating medium can be from about 5 to about 500, preferably from about 75 to about 550° F. above said maximum temperature. For sake of simplicity of description this heating medium will be described as oil at a temperature of about 550° F.

The 550° F. oil is added by 33 to the 250° F. oil in an amount and at a rate sufficient to form a composite oil stream in 34 which is substantially equal to the maximum allowable temperature of 275° F. The temperature of the composite stream can vary from about 0.98 that of the maximum temperature in degrees Fahrenheit substantially up to (but below) the maximum temperature in degrees Fahrenheit. The composite oil stream in 34 is brought up to and maintained at 275° F. by temperature recorder controller 35 which is operatively connected by 36 to 34 and by 37 to motor valve 38 in 33. Temperature recorder controller 35 is set at 275° F. and, for example, should the temperature of the composite stream in 34 fall below 275° F., motor valve 38 will open to a greater degree in order to allow an increase in rate of flow of 550° F. oil into 34 thereby increasing the temperature of the composite stream in 34. The increase in rate of flow of hot oil is maintained until the composite stream reaches 275° F. at which time temperature recorder controller 35 will by means of motor valve 38 decrease and then maintain constant the rate of flow of 550° F. oil utilized to form the composite stream in 34.

Although the amount of the second stream present in the composite stream can vary widely, generally the second stream will be present in the range of from about 2 to about 15, preferably from about 6 to about 10, still more preferably about 8, weight percent based on the composite stream and depending upon the temperatures of the oil in 32 and 33.

The composite stream then passes by 34 into manifold 20 of heat exchanger 19, through loop 21 and out through 39 to accumulator 30. Overflow oil is removed from accumulator 30 by 40 and passes out of the system for use elsewhere and/or to be heated and returned to the system at 550° F. oil through 33. Make-up oil can be added by 41 or prior to heating the oil present in line 33. The rate of flow of the composite stream in 34 into manifold 20 is controlled by liquid level controller 41 which is operatively connected by 42 to motor valve 43 in 34. Thus, for example, when the liquid level in heat exchanger 19 exceeds a preset value liquid level controller 41 will through 42 open motor valve 43 to thereby allow more heating fluid into heat exchanger 19 and vaporize additional liquid to decrease the liquid level in compartment 61 of reboiler 19. The amount of alkylate reaction mass which is removed by 23 is controlled by temperature controller 44 which is operatively connected to stripper 17 by 45 and by 46 to motor valve 47 in 23. Thus, if the temperature in stripper 17 should exceed a preset maximum value temperature controller 44 will open motor valve 47 to a greater extent thereby allowing a fastener rate of (larger amount of) alkylate reaction mass to be removed from heat exchanger 19 which in turn will lower the liquid level in 19 thereby causing liquid level controller 41 to close down motor valve 43 which, due to the lower rate of flow of composite stream 34 through reboiler 19, will cause less benzene vapor to be passed by 24 into stripper 17 thereby decreasing the amount of heat input to 17 and consequently lowering the temperature in same.

The alkylate reaction mass passing through 47 passes by 48 to separation zone 49 wherein benzene is removed from the mass and then passes by 50 through dryer 51 and through 52 to 25b and ultimately to 12 for reuse in alkylation zone 10. The alkylation reaction mass stripped of benzene is then passed by 53 to paraffin separation zone 54 in which paraffin is removed from the mass and passed by 55 to 2 and ultimately into accumulator 3. The alkylate is removed from 54 by 56 and further purified, stored and the like as desired.

Separation operations 49 and 54 can be any conventional operations known in the art such as fractionation, solvent extraction and the like.

EXAMPLE

A biodegradable alkylate is produced by alkylating a chlorinated normal paraffins feedstock containing:

| Number of carbon atoms per molecule: | Amount present wt. percent |
|---|---|
| 9 or less | 0.4 |
| 10 | 10 |
| 11 | 37 |
| 12 | 33 |
| 13 | 20 |
| 14 | 0.3 |

The paraffins feedstock has an average molecular weight of 164 and the chlorinated normal paraffins are alkylated with benzene. Stripper 17 is operated at 194° F. and 5 p.s.i.g. Reboiler 19 is operated at a temperature of about 250° F. and a pressure slightly higher than stripper 17. The following table relates the details as to the streams and compositions thereof and the process. Whenever the term "paraffins" is used in this example the above defined feed stock is referred to.

TABLE I

| Constituent | Pounds/ Hour | Parts Per Million |
|---|---|---|
| Feed 16 to stripper 17: | | |
| Paraffins | 10,032 | |
| Hydrogen chloride | 802 | |
| Benzene | 20,434 | |
| Phenyl alkylate | 3,969 | |
| Diphenyl alkylate | 859 | |
| Aluminum chloride | 12 | |
| Paraffins feed 6 to stripper 17: | | |
| Parffins | 1,764 | |
| Oxygen, nitrogen, carbon monoxide and carbon dioxide | | 1,000 |
| Overhead 57 from stripper: | | |
| Paraffins | 10 | |
| Hydrogen chloride | 802 | |
| Oxygen, nitrogen, carbon monoxide and carbon dioxide | | 2,000 |
| Overhead 25 from reboiler 19: | | |
| Paraffins | 593 | |
| Benzene | 14,234 | |
| Kettle product stream 23 from reboiler 19: | | |
| Paraffins | | |
| Benzene | | |
| Phenyl alkylate | | |
| Diphenyl alkylate | | |
| Aluminum chloride | | |

Accumulator 30 passes about 890 gallons per minute of virgin gas oil at a temperature of 250° F. Oil at a temperature of 558° F. passes through 33 into 34 at the rate of about 75 gallons per minute. The combination of oils from 32 and 33 form a composite oil stream 34 which is at a temperature of 275° F. and flows at a rate of 965 gallons per minute. The composite stream 34 then passes through manifold 20 of reboiler 19 and emerges through 39 at a temperature of about 245° F. Overflow oil from accumulator 30 passes through 40 at a rate on the order of 75 gallons per minute. The temperature of the alkylate reaction mass removed from reboiler 19 through 23 is about 244° F.

Reasonable variations and modifications of this invention can be made, or followed, in view of the foregoing discussion and disclosure, without departing from the spirit or scope thereof.

I claim:

1. A method of operating a distillation stripping zone having operatively connected therewith a reboiling zone comprising passing a liquid stream from the bottom of said stripping zone to said reboiling zone and therein vaporizing at least part of said liquid, removing a part of said vapors from said reboiling zone and from the system at a constant rate, removing the remaining vapors from said reboiling zone and passing same to a lower portion of said stripping zone, controlling the rate of heating of said reboiling zone in response to the liquid level in said zone, controlling the temperature in said stripping zone by regulating the rate of flow of liquid product from said reboiling zone, supplying heating liquid to said reboiling zone at a constant temperature, preparing said heating liquid at said constant temperature by adding a first stream of heating liquid at a temperature above said constant temperature to a second stream of heating liquid at a temperature below said constant temperature to provide a composite heating liquid to be used for supplying heating liquid to said reboiling zone at said constant temperature, adding a reflux liquid to the top of said stripping zone, removing stripped gas from the top of said stripping zone and adding liquid to be stripped by distillation near the vertical midpoint of said stripping zone.

2. A method of removing undesired halide compounds and hydrocarbons from an alkylation reaction mass containing same comprising passing said alkylation reaction mass to a distillation stripping zone maintained under conditions which at least partially vaporize said undesired halide compounds, countercurrently contacting said halide vapors with hydrocarbon feed to remove from said vapors any hydrocarbons present, passing said alkylation reaction mass freed of said halide to a heat exchange zone, providing a first stream of fluid heating medium at a temperature substantially below the dealkylation temperature of the alkylate in said alkylation reaction mass, providing a second stream of fluid heating medium at a temperature substantially above the dealkylation temperature of the alkylate in said alkylation reaction mass, adding said second stream to said first stream to produce a first composite stream of heating medium, sensing the temperature of said first composite stream, adjusting the rate of addition of one of said first and second stream to the other of said first and second stream in a response to the sensed temperature of said first composite stream to produce a subsequent composite stream at a temperature substantially equal to said dealkylation temperature and thereafter maintaining said subsequent composite stream at said dealkylation temperature by varying the rate of addition of one of said first and second stream to the other of said first and second stream, passing said subsequent composite stream into heat exchange relationship with said alkylation reaction mass in said heat exchange zone, sensing the amount of said alkylation reaction mass in said heat exchange zone, controlling the amount of said subsequent composite stream passing through said heat exchange zone by said sensing of the amount of said alkylation reaction mass in said heat exchange zone and varying the rate of flow of said subsequent composite stream to said heat exchange zone so that as said amount increases said rate of flow increases and vice versa, sensing the temperature in said stripping zone, removing from said heat exchange zone in response to temperature variations sensed in said stripping zone an alkylation reaction mass material heated substantially to but not above said dealkylation temperature.

3. The method according to claim 2 wherein said first stream is at a temperature of from about 0.05 to about 0.95 that of said maximum temperature in degrees Fahrenheit, said second stream is from about 1.3 to about 2.7 times more than said maximum temperature and said second stream is present in said composite stream in the amount of from about 2 to about 15 weight percent based upon the composite stream.

4. The method according to claim 2 wherein said first stream is at a temperature of about 0.91 that of the maximum temperature in degrees Fahrenheit and said second stream is present in the composite stream in the amount of about 8 weight percent based on the composite stream.

5. The method according to claim 2 wherein said alkylate reaction mass contains paraffins, aromatic, alkylate and catalyst, said fluid heating medium comprises oil, said maximum temperature is about 275° F., said first stream is at a temperature of about 250° F., said second stream is at a temperature of about 557° F. and said second stream is present in said composite stream in the amount of about 8 weight percent.

6. The method according to claim 2 wherein said alkylation reaction mass material is withdrawn in increasing amounts as the temperature in said stripping zone increases and vice versa.

7. The method according to claim 2 wherein said first stream is at a temperature of from about 5 to about 250° F. below the dealkylation temperature, said second stream is at a temperature of from about 5 to about 500° F. above said dealkylation temperature and said second stream is present in the subsequent composite stream in an amount of about 2 to about 15 weight percent based on the amount of the composite stream.

8. The method according to claim 2 wherein said hydrogen halide is hydrogen chloride, said hydrocarbon feed is paraffins, said aromatic is benzene, the dealkylation temperature is about 275° F., the temperature of the first stream is about 250° F., the temperature of the second stream is about 557° F. and the amount of said second stream present in the composite stream is about 8 weight percent of the composite stream.

9. The method of claim 2 wherein the rate of addition of said second stream is adjusted in response to the temperature of said first composite stream, and the amount of alkylation reaction mass in said heat exchange zone is sensed by sensing the liquid level of said reaction mass in said heat exchange zone.

References Cited

UNITED STATES PATENTS

| | | | |
|---|---|---|---|
| 2,222,575 | 11/1940 | Schutte | 202—160 |
| 2,414,371 | 1/1947 | Fragen et al. | 202—206 |
| 2,439,023 | 4/1948 | Robinson | 196—132 |
| 2,504,464 | 4/1950 | Stanley | 203—2 |
| 2,545,671 | 3/1951 | Passino | 260—671 |
| 2,578,670 | 12/1951 | Carleton | 202—153 |
| 3,002,818 | 10/1961 | Berger | 196—132 |
| 3,111,942 | 11/1963 | Miller | 236—12 |
| 3,223,749 | 12/1965 | Van Pool et al. | 196—132 |
| 3,224,210 | 12/1965 | Albritton | 202—160 |
| 3,309,288 | 3/1967 | Butterbaugh | 203—2 |

WILBUR L. BASCOMB, JR., *Primary Examiner.*